(12) United States Patent
Itoh et al.

(10) Patent No.: US 8,718,274 B2
(45) Date of Patent: May 6, 2014

(54) INTERFACE CIRCUIT AND MAIN DEVICE

(75) Inventors: Toshihiko Itoh, Kanagawa (JP); Seiji Masumoto, Kanagawa (JP)

(73) Assignee: NEC Infrontia Corporation, Tokyo (JP)

( * ) Notice: Subject to any disclaimer, the term of this patent is extended or adjusted under 35 U.S.C. 154(b) by 0 days.

(21) Appl. No.: 13/977,338

(22) PCT Filed: Sep. 2, 2011

(86) PCT No.: PCT/JP2011/070020
§ 371 (c)(1),
(2), (4) Date: Jun. 28, 2013

(87) PCT Pub. No.: WO2012/096027
PCT Pub. Date: Jul. 19, 2012

(65) Prior Publication Data
US 2013/0279688 A1 Oct. 24, 2013

(30) Foreign Application Priority Data
Jan. 14, 2011 (JP) ................................. 2011-006103

(51) Int. Cl.
H04M 1/00 (2006.01)
(52) U.S. Cl.
USPC ..................................... 379/395.01; 379/159
(58) Field of Classification Search
None
See application file for complete search history.

(56) References Cited

U.S. PATENT DOCUMENTS

| | | | | |
|---|---|---|---|---|
| 7,764,775 | B2 * | 7/2010 | Tarkoff et al. | 379/167.02 |
| 2007/0041544 | A1 * | 2/2007 | Oblad | 379/159 |
| 2007/0291916 | A1 * | 12/2007 | Oblad | 379/159 |

FOREIGN PATENT DOCUMENTS

| | | | |
|---|---|---|---|
| JP | 62-25009 | Y2 | 6/1987 |
| JP | 64-89650 | A | 4/1989 |
| JP | 3-101590 | A | 4/1991 |
| JP | 04-354498 | A | 12/1992 |
| JP | 05-003579 | A | 1/1993 |
| JP | 05-049068 | A | 2/1993 |
| JP | 8-205216 | A | 8/1996 |
| JP | 9-172477 | A | 6/1997 |
| JP | 10-224503 | A | 8/1998 |
| JP | 2000-049954 | A | 2/2000 |
| JP | 2002-135436 | A | 5/2002 |

(Continued)

OTHER PUBLICATIONS

International Search Report of PCT/JP2011/070020 dated Oct. 4, 2011.

(Continued)

*Primary Examiner* — Fan Tsang
*Assistant Examiner* — Jeffrey Lytle
(74) *Attorney, Agent, or Firm* — Sughrue Mion, PLLC

(57) ABSTRACT

There is provided an interface circuit according to which a telephone or an intercom may be connected to a port of a main device including a telephone exchange function. The interface circuit includes a power supply circuit that supplies necessary power supply voltage according to the telephone or the intercom connected to the port, and a state detection circuit that detects, in a case where the telephone is connected to the port, whether the telephone is in an on-hook state or in an off-hook state, based on the value of an input impedance of the telephone, and that detects, in a case where the intercom is connected to the port, whether the intercom is in a standby state or in an activation button pressed state, based on a value of the input impedance of the intercom.

3 Claims, 1 Drawing Sheet

(56) References Cited

FOREIGN PATENT DOCUMENTS

| JP | 2003-229956 A | 8/2003 |
|----|---------------|--------|
| JP | 2003-229968 A | 8/2003 |
| JP | 2005-175860 A | 5/2005 |
| JP | 2010-288105 A | 12/2010 |

OTHER PUBLICATIONS

Japanese Office Action issued Sep. 20, 2011 in corresponding Japanese Patent Application No. 2011-006103.
Japanese Office Action issued Nov. 22, 2011 in corresponding Japanese Patent Application No. 2011-006103.

* cited by examiner

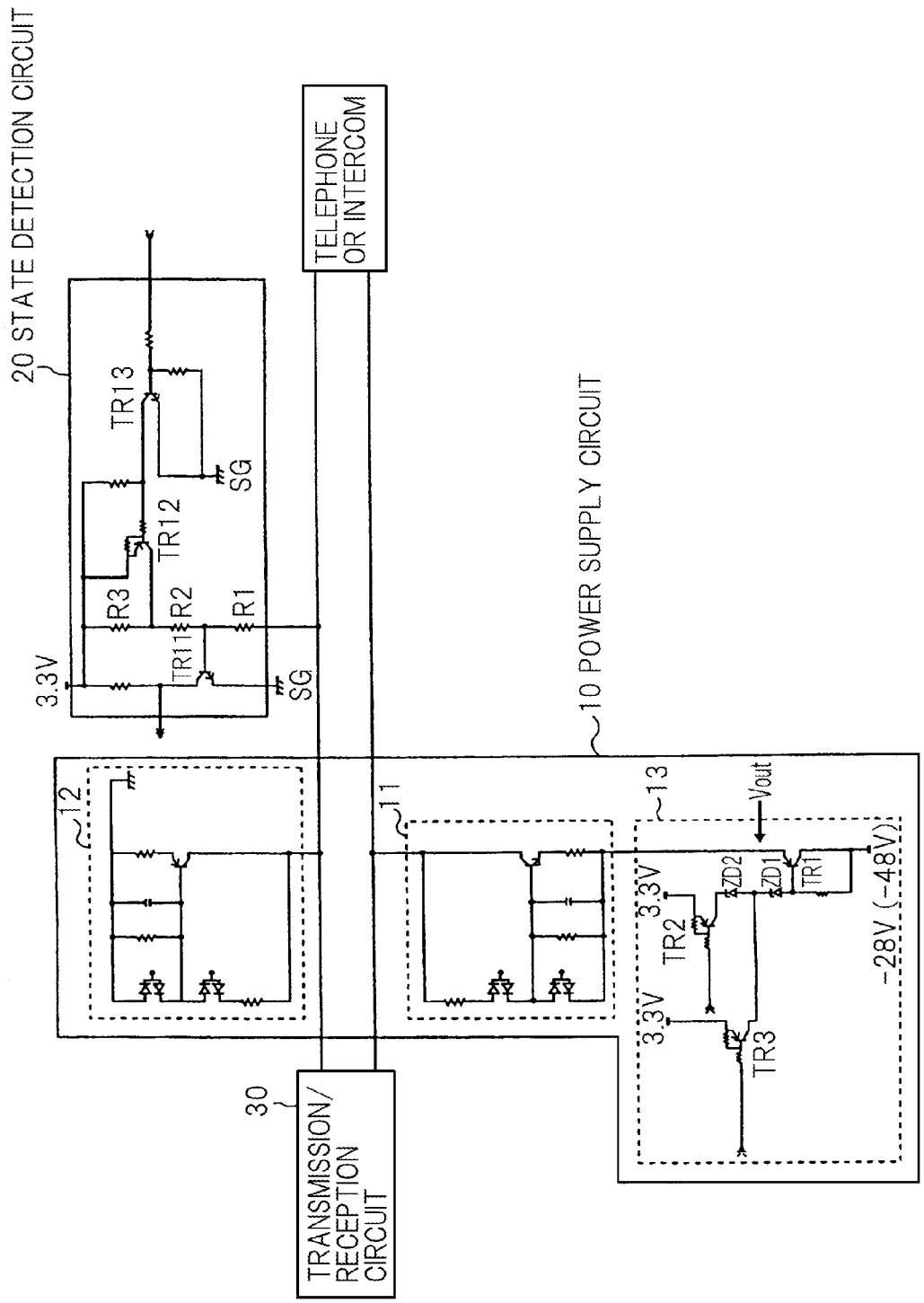

INTERFACE CIRCUIT AND MAIN DEVICE

CROSS REFERENCE TO RELATED APPLICATIONS

This is a National Stage of International Application No. PCT/JP2011/070020 filed Sep. 2, 2011, claiming priority based on Japanese Patent Application No. 2011-006103 filed Jan. 14, 2011, the contents of all of which are incorporated herein by reference in their entirety.

TECHNICAL FIELD

The present invention relates to an interface circuit for a telephone or an intercom, the interface circuit being provided to a main device of a key telephone system or the like.

BACKGROUND ART

As a telephone exchange system for homes and small and medium-sized enterprises, there is known a key telephone system including a main device that has a telephone exchange function and to which a public telephone network or a commercial telephone is connected, the key telephone system enabling, by the telephone exchange function of the main device, external communication by each telephone in the system using the public telephone network or internal communication between the telephones in the system.

A recent key telephone system may use various external appliances, and there is, for example, a configuration for enabling communication between a telephone and an intercom in a system by connecting the intercom (an intercom substation installed at the front door, a doorway or the like) to a main device.

An interface circuit for an intercom that may be installed in a main device is described in Patent Literature 1, for example. Also, Patent Literatures 2 to 4 describe adapters for enabling connection of an intercom to a port for connecting a telephone of a main device, for example.

As described, with the key telephone system according to the related art, in the case of installing an intercom, a dedicated connection port for the intercom has to be provided to the main device or a dedicated unit (an adapter) for enabling connection of the intercom has to be prepared.

Now, a configuration for providing a main device with a dedicated connection port for an intercom may be a factor that prevents miniaturization of the main device.

On the other hand, with the configuration for providing a dedicated unit for an intercom, a dedicated connection port for an intercom does not have to be provided, and the system cost for a user who does not need to be connected to an intercom can be reduced. However, in the case where a user who wants to use an intercom cannot secure an installation space for the dedicated unit, the dedicated unit will, in many cases, have to be accommodated inside a main device. Accordingly, a free space, a connector or the like for attaching the dedicated unit have to be provided to the main device, and thus, also with the configuration for separately providing a dedicated unit, miniaturization of the main device may be prevented.

RELATED ART LITERATURE

Patent Literature

Patent Literature 1: Japanese Patent Laid-Open No. 05-49068

Patent Literature 2: Japanese Patent Laid-Open No. 04-354498
Patent Literature 3: Japanese Patent Laid-Open No. 05-3579
Patent Literature 4: Japanese Patent Laid-Open No. 2003-229956

SUMMARY

Accordingly, the present invention has its object to provide an interface circuit for a telephone and an intercom and a main device including the interface circuit which are capable of realizing miniaturization of the main device.

To achieve the object described above, an interface circuit of an exemplary aspect of the present invention is an interface circuit provided correspondingly to a port of a main device including a telephone exchange function, the port allowing connection of a telephone or an intercom, the interface circuit including:

a power supply circuit that supplies necessary power supply voltage according to the telephone or the intercom connected to the port; and a state detection circuit that detects, in a case where the telephone is connected to the port, whether the telephone is in an on-hook state or in an off-hook state, based on the value of the input impedance of the telephone, and that detects, in a case where the intercom is connected to the port, whether the intercom is in a standby state or in an activation button pressed state, based on the value of an input impedance of the intercom.

On the other hand, the main device of an exemplary aspect of the present invention is a main device to be used in a key telephone system, the main device being provided with a telephone exchange function, the main device including:

a port to be connected with a telephone or an intercom, the port including the interface circuit; and a transmission/reception circuit that enables external communication or internal communication by the telephone, or communication between the intercom and the telephone.

BRIEF DESCRIPTION OF DRAWINGS

FIG. 1 is a circuit diagram showing an example of the configuration of an interface circuit of the present invention.

EXEMPLARY EMBODIMENT

In the following, the present invention will be described with reference to the drawing.

In the present invention, miniaturization of a main device is realized by enabling connection of a telephone or an intercom to the same port.

Generally, voltage (direct voltage) to be supplied as power source is different for a telephone and an intercom, and the input impedance to the main device is different.

In Japan, normally, −48V is supplied to the telephone, in the same manner as for a switch node (a configuration is also possible where direct voltage of −24V is supplied, for example, to reduce power consumption). Also, outside Japan, voltage lower than the voltage of a switch node, for example, direct voltage of −28V is supplied. With respect to the intercom, direct voltage of −5V is supplied at the time of standby, for example, and at the time of communication, higher direct voltage of −10V, for example, is supplied to secure a dynamic range of audio signals.

Also, with respect to the telephone, the input impedance is high when on-hook (standby), and the input impedance is low when off-hook (communicating). On the other hand, with respect to the intercom, the input impedance is high when in standby state and when in communication state, and when an activation button is pressed, the input impedance is lowered.

The intercom (the substation) connected to the main device is basically not allowed to actively control a communication state and a standby state, and a microphone and a speaker are in operation when in the standby state and when in the communication state. Normally, the intercom has a resistor or the like inserted between lines to lower the inter-line impedance on the line side at the time of pressing of the activation button, to detect whether or not the activation button has been pressed. Thus, when the activation button is pressed, the input impedance is changed (lowered).

Accordingly, to enable connection of the telephone and the intercom to the same port, a power supply circuit for supplying necessary power supply voltage according to the connected telephone or intercom is necessary. Also, a state detection circuit for detecting, based on the value of the input impedance of a connected appliance, whether, in the case where the telephone is connected, the telephone is in an on-hook state or in an off-hook state, and whether, in the case where the intercom is connected, the intercom is in a standby state or in an activation button pressed state, is necessary.

In the case where the intercom is connected to the port, when the intercom shifts from the standby state to the activation button pressed state, the input impedance is changed as described above, and whether the intercom is in the standby state or in the activation button pressed state may be detected even when a common circuit is used for the telephone and the intercom as the state detection circuit. However, since the difference in the input impedance between the on-hook state and the off-hook state of the telephone is great, and the difference in the input impedance between the standby state and the activation button pressed state of the intercom is generally small, the state detection circuit needs to change the sensitivity for state detection that uses the input impedance according to the connected appliance.

In the case where the telephone is connected to the port, the power supply circuit must be provided with a constant current circuit to supply a constant current to the talking circuit of the telephone at the time of communication. If the power supply voltage to be supplied to the constant current circuit is made common with the voltage to be supplied to the intercom, for example, since the input impedance of the intercom when in the standby state or when in the communication state is high as described above, direct voltage that is higher than in the communication state of the telephone is applied to the intercom. As described above, the power supply voltage (the rated voltage) to be supplied to the intercom is different from the feeding voltage to be supplied to the telephone, and thus, the power supply circuit needs to change the supply voltage according to the connected appliance.

An example of an interface circuit according to a present exemplary embodiment including a power supply circuit and a state detection circuit which have overcome these issues is shown in FIG. 1.

FIG. 1 is a circuit diagram showing an example of the configuration of an interface circuit of the present invention.

The interface circuit shown in FIG. 1 includes power supply circuit 10 for supplying necessary power supply voltage according to a telephone or an intercom connected to a port, and state detection circuit 20 for detecting, based on the value of the input impedance of a connected appliance, whether, in the case where the telephone is connected, the telephone is in an on-hook state or in an off-hook state, and whether, in the case where the intercom is connected, the intercom is in a standby state or in an activation button pressed state.

Known transmission/reception circuit 30 is connected to the port to which the telephone or the intercom is connected, to enable external communication or internal communication by the telephone or communication between the intercom and the telephone. The interface circuit shown in FIG. 1 may be installed in a port for a telephone (for analog extension, for example) provided to a main device, for example.

Power supply circuit 10 includes first constant current circuit 11 and second constant current circuit 12 connected to two lines of the port of the main device, and voltage circuit 13 for supplying power supply voltage to first constant current circuit 11. First constant current circuit 11 is supplied by voltage circuit 13 with power supply voltage according to the telephone or the intercom, and second constant current circuit 12 is connected to a reference potential (SG).

As first constant current circuit 11 and second constant current circuit 12, a known constant current circuit is used which has a diode connected in parallel with the base and emitter of a transistor, for example, and which is for making current that is flowing between a collector and an emitter constant by controlling the voltage between the base and emitter of the transistor by the forward voltage of the diode.

Voltage circuit 13 includes transistor TR1 for supplying power supply voltage Vout to first constant current circuit 11, zener diodes ZD1 and ZD2 for setting power supply voltage Vout to be supplied to first constant current circuit 11 to the necessary voltage according to the telephone or the intercom connected to the port, and transistors TR2 and TR3 for switching power supply voltage Vout to be supplied to first constant current circuit 11 according to the telephone or the intercom connected to the port.

According to such a configuration, when the telephone is connected to the port, transistors TR2 and TR3 are each turned off. At this time, −28V (or −48V) is supplied by transistor TR1 to first constant current circuit 11.

On the other hand, when the intercom is connected to the port (standby), transistor TR2 and TR3 are each turned on. At this time, power supply voltage Vout output from transistor TR1 is the voltage expressed by the following equation (1).

$$VOUT = -(VZD1 - 3.3) \qquad (1)$$

where 3.3(V) is power supply voltage to be supplied to transistor TR2 and transistor TR3 of voltage circuit 13, and VZD1 is zener voltage of zener diode ZD1.

Also, when the activation button is pressed in a state where the intercom is connected to the port, and when a communication state is reached, transistor TR2 is turned on and transistor TR3 is turned off. At this time, power supply voltage Vout to be output from transistor TR1 is the voltage expressed by the following equation (2).

$$VOUT = -(VZD1 + VZD2 - 3.3) \qquad (2)$$

where VZD2 is zener voltage of zener diode ZD2.

State detection circuit 20 includes transistor TR11 for detecting on-hook/off-hook of the telephone or standby/activation button pressing of the intercom, and outputting the detection result, resistors R1 to R3 that are connected in series and that are used for setting the detection sensitivity for detecting on-hook/off-hook of the telephone or standby/activation button pressing of the intercom according to the telephone or the intercom connected to the port, and transistors TR12 and TR13 for switching the detection sensitivity for detecting on-hook/off-hook of the telephone or standby/activation button pressing of the intercom according to the telephone or the intercom connected to the port. Additionally, the resistance value of each of resistors R1 to R3 may be realized by a plurality of resistors connected in series or in parallel.

In the case where the telephone is connected to the port, transistors TR12 and TR13 are each turned on. At this time, a potential difference between the power supply voltage (3.3V) supplied to state detection circuit 20 and the port is divided by resistor R1 and resistor R2 that are connected in series and is applied to the base of transistor TR11. That is, the detection sensitivity for detecting on-hook/off-hook of the telephone is set according to the ratio between resistors R1 and R2.

On the other hand, in the case where the intercom is connected to the port, transistors TR12 and TR13 are each turned off. At this time, a potential difference between the power supply voltage (3.3V) supplied to state detection circuit 20 and the port is divided by resistor R1 and resistors R2 and R3 that are connected in series and is applied to the base of transistor TR11. That is, the detection sensitivity for detecting standby/activation button pressing of the intercom is set according to the ratio between resistor R1 and resistors R2+R3. The detection result output from transistor TR11 is supplied to a controller including a CPU and the like for controlling the overall operation of the main device. The controller controls the operation of transmission/reception circuit 30 and the like according to the state of the telephone or the intercom detected by state detection circuit 20.

Moreover, on/off of transistors TR1 and TR2 provided to power supply circuit 10, and on/off of transistors TR12 and TR13 provided to state detection circuit 20 may be controlled by providing a switch (not shown) to the housing of the main body, for example, and by a combination of on/off of the switch and a simple logic circuit (not shown). A user of the key telephone system may switch the switch depending on whether the telephone is connected to the port or whether the intercom is connected thereto, for example. The main device may determine whether the appliance connected to the port is the telephone or the intercom based on the setting of the switch, and may also switch necessary software and the like according to the connected appliance.

Also, an example of a configuration is shown in FIG. 1 where power supply voltage of 3.3V is supplied to transistors TR1 and TR2 of power supply circuit 10, and transistors TR11 to TR13 provided to state detection circuit 20, but the voltage that is to be supplied to these transistors is not restricted to 3.3V, and it may be any number of volts as long as it is within a range where each transistor may operate normally.

Also, an example is shown in FIG. 1 with respect to the interface circuit where PNP transistors are used as transistors TR1 to TR3 and TR12, and NPN transistors are used as transistors TR11 and TR13, but a configuration is also possible where NPN transistors are used as transistors TR1 to TR3 and TR12, and PNP transistors are used as transistors TR11 and TR13.

Furthermore, an example configuration is shown in FIG. 1 where a bipolar transistor is used as each transistor of the interface circuit, but it is also possible to use field effect transistors as the transistors.

According to the interface circuit of the present exemplary embodiment, the telephone and the intercom may be connected to the same port by a simple circuit configuration, and thus, a connection port dedicated to the intercom does not have to be provided to the main device. Moreover, since a dedicated unit for enabling connection of the intercom is also unnecessary, the key telephone system including the intercom may be easily structured, and free space, a connector or the like for attaching the dedicated unit does not have to be provided to the main device. Accordingly, miniaturization of the main device provided to the key telephone system may be realized.

Generally, a port to which a telephone is to be connected is installed in many of the main devices provided to the key telephone systems, and if switching of the feeding voltage according to the telephone or the intercom and of the detection sensitivity for on-hook/off-hook of the telephone or standby/activation button pressing of the intercom is performed using a switch provided to the housing or the like, the switching does not have to be controlled by software. Thus, the interface circuit of the present exemplary embodiment may be easily applied to the main device provided to the key telephone system.

Heretofore, the present invention has been described with reference to the exemplary embodiment, but the present invention is not restricted to the exemplary embodiment described above. Various modifications understandable to those skilled in the art and within the scope of the present invention may be made with respect to the configuration or the details of the present invention.

This application is based upon and claims the benefit of priority from Japanese Patent Application No. 2011-006103, filed on Jan. 14, 2011, the disclosure of which is incorporated herein in its entirety.

The invention claimed is:

1. An interface circuit provided correspondingly to a port of a main device including a telephone exchange function, the port allowing connection of a telephone or an intercom, the interface circuit comprising:
   a power supply circuit that supplies necessary power supply voltage according to the telephone or the intercom connected to the port; and
   a state detection circuit that detects, in a case where the telephone is connected to the port, whether the telephone is in an on-hook state or in an off-hook state, based on a value of an input impedance of the telephone, and that detects, in a case where the intercom is connected to the port, whether the intercom is in a standby state or in an activation button pressed state, based on a value of an input impedance of the intercom,
   wherein the power supply circuit includes
   a voltage circuit that generates the necessary power supply voltage according to the telephone or the intercom,
   a first constant current circuit that is connected between one line of two lines of the port and the voltage circuit, and
   a second constant current circuit that is connected between another line of the two lines of the port and a ground potential,
   wherein the voltage circuit includes
   a first transistor that is inserted between a first voltage supply that outputs negative voltage according to the telephone and the first constant current circuit, and that has a control terminal to which output voltage of the first voltage supply is supplied,
   a second transistor, a first zener diode and a second zener diode that are inserted in series between a second voltage supply that outputs higher positive voltage than the first voltage supply and the control terminal of the first transistor, and
   a third transistor that is inserted between a connection node of the first zener diode and the second zener diode and the second voltage supply,
   wherein the second transistor and the third transistor are each turned off when the telephone is connected to the port,
   wherein the second transistor and the third transistor are each turned on when the intercom is connected to the port and the intercom is in the standby state, and wherein the second transistor is turned on and the third transistor is turned off when the intercom is connected to the port and is in the activation button pressed state.

2. The interface circuit according to claim 1,
wherein the state detection circuit includes
a fourth transistor that detects a state in which the telephone is on-hook or off-hook, or that detects a state in which the intercom is a standby state or a state in which an activation button of the intercom has been pressed, and that outputs a detection result,
a plurality of resistors that are inserted in series between said another line of two lines of the port and the second voltage supply, and that are used for setting a detection sensitivity for detecting a state in which the telephone is on-hook or off-hook, or for detecting a state in which the intercom is a standby state or a state in which an activation button of the intercom has been pressed, according to the telephone or the intercom connected to the port, where a connection node is connected to a control terminal of the fourth transistor, and
a fifth transistor and a sixth transistor that are each turned on when the telephone is connected to the port, and that are each turned off when the intercom is connected to the port, when the fifth transistor and the sixth transistor are turned on, a short occurs at each end of the resistors which are inserted between the second voltage supply and the control terminal of the fourth transistor, when the fifth transistor and the sixth transistor are turned off, an open occurs at each end of the resistors.

3. A main device to be used in a key telephone system, the main device being provided with a telephone exchange function, the main device comprising:
a port to be connected with a telephone or an intercom, the port including an interface circuit according to claim 1; and
a transmission/reception circuit that enables external communication or internal communication by the telephone, or communication between the intercom and the telephone.

* * * * *